Sept. 14, 1937.  F. L. LAMOREAUX  2,093,323
SLICING MACHINE
Filed Aug. 24, 1935    3 Sheets-Sheet 1
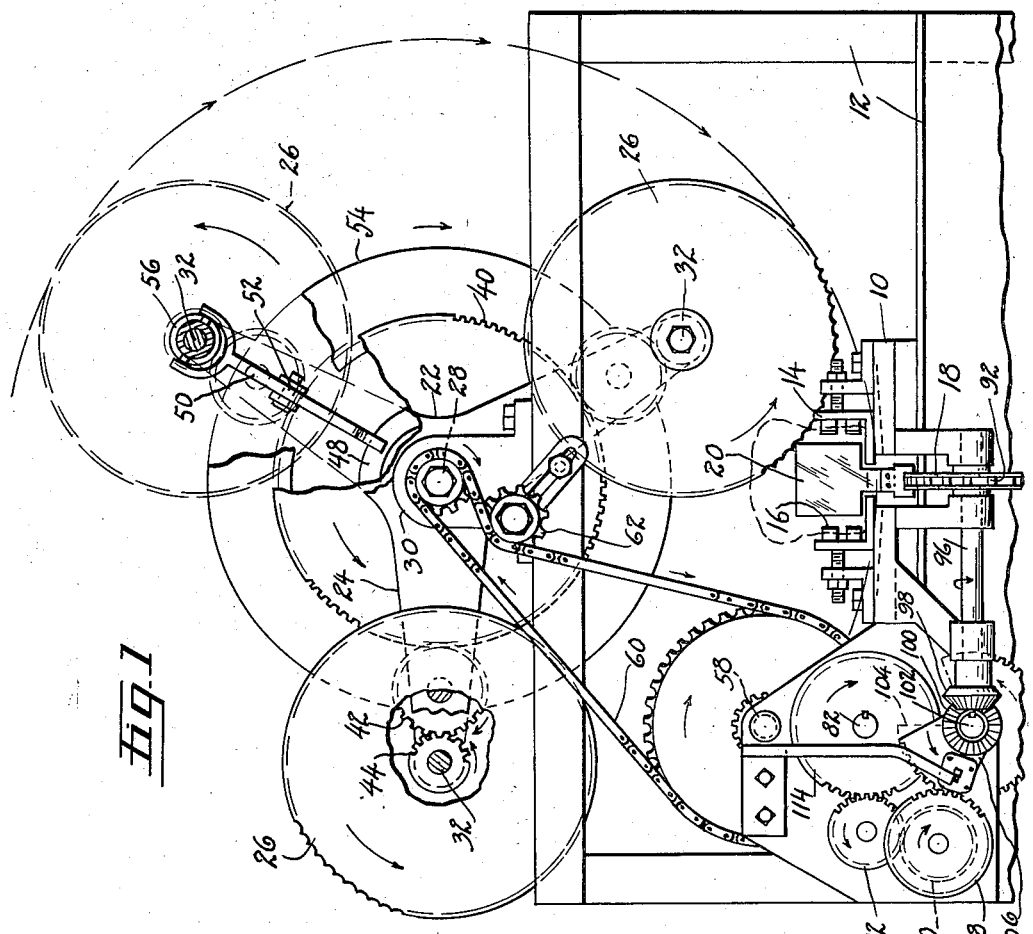
INVENTOR.
Frank L. Lamoreaux
BY
Parker & Burton
ATTORNEYS.

Sept. 14, 1937.  F. L. LAMOREAUX  2,093,323
SLICING MACHINE
Filed Aug. 24, 1935  3 Sheets-Sheet 2
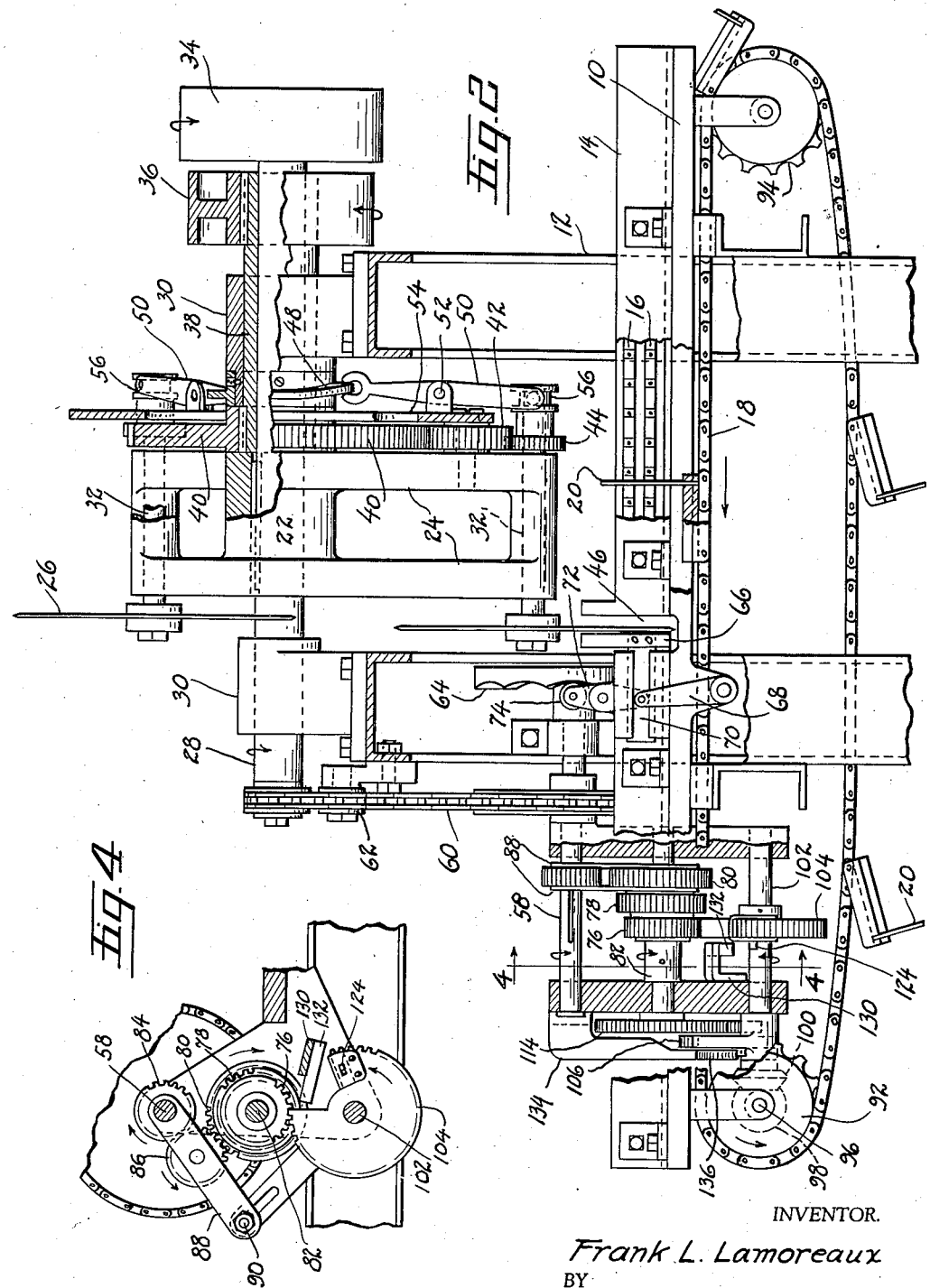
INVENTOR.
Frank L. Lamoreaux
BY
Parker & Burton
ATTORNEYS

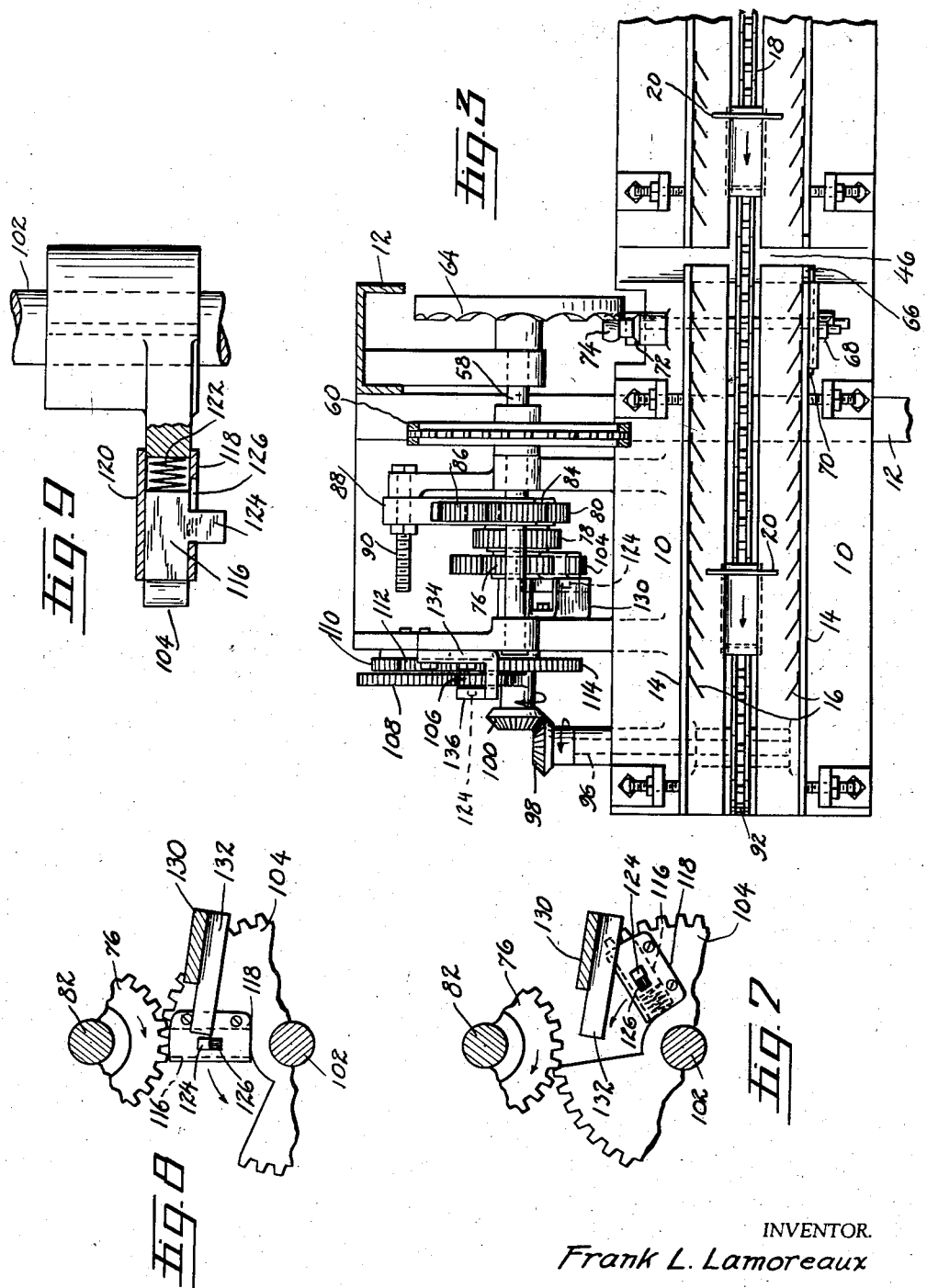

Patented Sept. 14, 1937

2,093,323

UNITED STATES PATENT OFFICE 2,093,323

SLICING MACHINE

Frank L. Lamoreaux, Detroit, Mich., assignor to Acme-Detroit Saw Corporation, Detroit, Mich., a corporation of Michigan Application August 24, 1935, Serial No. 37,612

9 Claims. (Cl. 146—101)

My invention relates to improvements in the method and apparatus for slicing material, and particularly to improvements in the slicing machinery described in my copending application, Serial No. 718,322, filed March 31, 1934.

In my copending application, a bread slicing machine is shown which continuously advances loaves of bread in successive order past a plurality of revolving and rotating cutters. Each cutter is adapted as it passes through a loaf to shift bodily axially in the direction and at substantially the rate of the advance of the moving loaf to produce a slice of even thicknesses and without interrupting the advance of the loaf. The advance of the loaf conveyor and the revolution of the cutters are timed by mechanism operatively coupling the two together.

An object of this invention is to improve the operation of the apparatus described in my copending application and to provide a novel method of feeding bread for purposes of slicing. This method expedites the production of sliced loaves of bread by economizing in the amount of time and energy required to slice a batch of loaves. Formerly, as for example in my copending case, the conveyor advanced at substantially the same rate of speed whether a loaf was being sliced or whether the knives were ineffectively traversing the space between the loaves. Under the new method, the advance of the loaves is greatly accelerated following the slicing of one loaf and the approach of the succeeding loaf to the place of slicing. That is to say, the method comprises advancing the loaf impelling conveyor at one speed when a loaf is being sliced but when an unoccupied section of the conveyor is presented to the cutter, the loaf advance is immediately speeded up until the next loaf has entered the cutting area.

To accomplish this purpose I provide improvements in mechanism which times the action of the conveyor feed with the spatial position of the material being sliced. These improvements include a speed change mechanism which is constructed and arranged to drive the conveyor at one speed while a loaf is being cut and at a greater speed when the space between successive loaves is passing the slicing point. In the apparatus described herein, this is accomplished by a pair of segment gears which form a part of the conveyor drive and which are adapted to alternately drive the conveyor at differing rates of speed. The driving actions of these segment gears are timed with the passage of the loaves of bread across the path of the cutters so that when a loaf is being sliced the conveyor is driven by one of the segment gears but when a space between adjacent loaves is traversing the path of the cutter, the conveyor is driven by the other segment gear at a much greater rate of speed.

Various other objects, advantages, and meritorious features of my invention will more fully appear from the following description, appended claims, and accompanying drawings, wherein:

Figure 1 is an end elevation of the discharge end of my bread slicing machine,

Fig. 2 is a longitudinal vertical section through the machine, partly broken away, Fig. 3 is a horizontal longitudinal section showing the conveyor and driving mechanism in plan, Fig. 4 is a vertical transverse section taken on the line 4—4 of Fig. 2 showing the change speed mechanism in elevation, Fig. 5 is an elevation of a fragment of the structure in Fig. 1 showing mechanism, including a segment gear, associated with the conveyor drive to temporarily accelerate the speed thereof when the spaces between the loaves are presented to the cutters, Fig. 6 is another position of the structure shown in Fig. 5, Fig. 7 is an elevation of a fragment of the structure in Fig. 4 showing mechanism, including a segment gear, associated with the conveyor drive for advancing the conveyors when a loaf of bread is traversing the path of the cutters, Fig. 8 is another position of the structure shown in Fig. 7, Fig. 9 is a detail view showing the construction of the yieldable teeth on the segment gears, and Fig. 10 is an elevation of a modification showing the manner of removably securing various sizes of segment gears.

The major portion of the slicing machine shown in the drawings is described and claimed in my copending application, Serial No. 718,322. It consists of a bed plate 10 mounted upon suitable frame work 12 which supports the machine at a convenient height from the floor. The slicing trough is formed by complementary angular wall sections 14, the inner or adjacent faces of which are provided with a multiplicity of angularly projecting flexible fingers or feathers 16 which serve to automatically center the loaves of bread in the trough as they are advanced by a conveyor mechanism.

The conveyor mechanism comprises an endless chain 18 upon which are pivotally secured loaf impelling devices or paddles 20. Paddles 20 engage the rear end of the loaf and urge the same onward. A series of supports or paddles may be secured to the chain for engaging the front end of the load. These paddles function to retain the slices in upright position after the loaf has been sliced. The front paddles may be adjustable on their support to accommodate loaves of varying lengths. Paddles 20 are uniformly spaced along the chain. This arranges the loaves of bread in a predetermined uniformly spaced succession as they are advanced.

Cutter mechanism is provided to slice the loaves as they are advanced by the conveyor. This cutter mechanism is best shown in Figs. 1 and 2 and comprises a cutter carrier 22 having radial arms 24 upon the ends of which are rotatably journalled cutting discs or knives 26. The carrier 22 is fixed on a shaft 28 which is rotatably journalled in supports 30 on the frame 12. The knives are secured on shafts 32 which are journalled in the ends of the radial arms of the carrier. A pulley 34 fixed to shaft 28 is suitably driven from a source of power, not shown, to rotate the carrier.

The knives are individually rotated by mechanism coupled with the pulley 36 which, similar to pulley 34, is driven from a source of power not shown. Pulley 36 is keyed to a sleeve 38 at the other end of which is a ring gear 40 splined thereto. An idler pinion 42 is provided on each of the radial arms for engagement with the ring gear. Each idler gear engages a pinion 44 on each of the knife shafts 32. As shown by the arrows in the drawings pulleys 34 and 36 are driven in opposite directions. This has the effect, as explained in my copending case, of revolving the carrier in one direction while the knives individually rotate in the other direction. The path of the knives across the conveyor 18 is referred to as the cutter-way and is indicated at 46.

As described and claimed in my copending application, the knives are axially bodily adjustable in the direction and at substantially the same rate as the conveyor as they pass through the cutter-way. This axial movement of each cutter knife is obtained in the following manner: Shaft 32 is longitudinally shiftable through its bearing in the carrier. A stationary cam 48 is secured to the support 30 as shown in Fig. 2. This cam has an axially deflected portion at its lowermost extent. A rocker arm 50 is pivoted at 52 to element 54 carried by the carrier. This rocker arm is forked at one end to embrace the cam and at its opposite end to engage the grooved end 56 of the hub of the pinion 44 which is keyed to the cutter knife shaft 32. It is clear that upon revolution of the knives by the carrier the travel of the forked end of the rocker arm 50 about the stationary cam 48 will rock the arm and move the shaft endwise to cause the knives to be moved axially as the carrier rotates. The cutter-way 46 is of such a width as to permit this axial movement of the knife as it traverses the trough. This insures that the knife will sever a slice of uniform thickness as it passes through the moving loaf of bread.

The shaft 28 is coupled with a parallel shaft 58 below and to one side of the former through a chain drive 60. Idler pinion 62 holds the chain out of the way of the slicing trough and is adjustable to vary the tension of the chain. Shaft 58 carries a castellated jumping cam 64 which is adapted to operate a closure gate 66 for one side of the slicing trough at the cutter-way 46 in synchronism with and immediately in advance of the axial movement of the cutter knife as it moves through the cutter-way. The gate is located adjacent the cutter-way on that side of the slicing trough entered by the knife. The gate is adapted to engage the side edge of the slice as it is being cut and urge the slice away from frictional contact with the knife as the latter severs the slice. The gate is adapted to advance lengthwise of the trough at a greater rate than the axial movement of the knife. This prevents the body of the knife from drawing out the softer portions of the slice of bread as it rotates and revolves past the slice.

As shown and described in my copending application, the closure gate is actuated from the cam by a rocker arm 68 extending under the slicing trough and provided with upstanding arms, one of which connects with an extension 70 on the gate and the other of which is engaged by a pivoted rocking member 72 having a roller 74 which rides over the castellated formation on cam 64. The gate is actuated when the castellated cam rotates and oscillates the rocking member 72 and the rocker arm 68. The formation of the cams and the leverage action of the rocking elements are such that the gate shifts in the direction of the conveyor advance at a greater rate than the axial movement of the knives.

The conveyor chain 18 is driven from the shaft 58 through speed change mechanism which synchronizes the slicing movement of the knives with the advance of the conveyor. It is this portion of the machine to which the present invention mainly relates. Similarly as in my copending application, a train of change speed gearing, namely, 76, 78, and 80 (see Fig. 2), are provided on a shaft 82. A shiftable pinion 84 and idler 86 couple the shaft 58 with any one of the gears in the train. Pinion 84 is keyed to shaft 58 but is slidable lengthwise thereover. Both the pinion 84 and roller 86 are confined within the forked link 88 which is adjustably mounted on stud 90. The thickness of the slice is determined by which gear 76, 78, or 80 is engaged by the idler pinion 86 for driving.

The sprocket wheels 92 and 94 support the conveyor chain 18. Sprocket 92 is mounted on shaft 96 which is provided with a bevel gear 98 engageable with a cooperating bevel gear 100 on the end of a shaft 102. This shaft is parallel with the change gear shaft 82 and is adapted to be coupled therewith through the intermediary of two segment gears which operate in alternate manner.

One of these segment gears or gear sectors is indicated at 104 and is fixed on shaft 102 opposite gear 76, with which it engages. This segment gear as shown in Figs. 4, 7, and 8 is lacking in approximately one-eighth of its area. This segment gear is designed to drive the conveyor from the time when the front end of a loaf advances into the cutter-way until the rear end has passed thereby. The cut-away portion of the gear represents the space interval between two adjacent loaves. It is at this point that the conveyor drive is transferred to another segment gear which accelerates the advance of the conveyor until the next succeeding loaf enters the cutter-way.

This last mentioned gear segment is indicated at 106 and is likewise fixed on shaft 102. This segment gear as shown in Figs. 5 and 6 is of a size approximating the cut-away portion of segment gear 104. It is arranged to take up the drive to the conveyor when the other segment gear is ineffective. Gear segment 106 is coupled with shaft 82 through a train of gears 108, 110, 112, and 114 which, in the apparatus disclosed herein, increases the speed of the conveyor to three times the speed imparted thereto by the other and larger segment gear 104. Gear 114 is keyed on shaft 82 and continuously drives this train of gears.

Both segment gears 104 and 106 have their first engaging teeth mounted for yieldable movement radially. As each segment gear takes up the drive to the conveyor, these teeth are retracted until directly opposite the teeth in the cooperating gear, at which time these teeth spring in positive engagement. As shown in the drawings, particularly Figs. 5, 6, 7, 8, and 9, the first two teeth of each segment gear are formed on a sliding member 116 which is housed between side plates 118 and 120 secured by screws or otherwise to the opposite sides of the segment gears. Sliding members 116 are resiliently urged outwardly radially by a spring 122 as best shown in Fig. 9. Each sliding member is provided with a lateral extension or ledge 124 which protrudes through a radial slot 126 in the side plate 118. The slot marks the upper and lower limits of travel of the sliding member. At its upper or raised position, the teeth of the sliding member are coextensive with the other teeth on the segment gear. At its lower or depressed position, the teeth are retracted sufficiently to be out of engagement with the teeth on the cooperating gear.

Any suitable means may be employed for depressing these teeth just prior to their engagement with their respective cooperating gears. As shown in connection with the larger segment gear in Figs. 4, 7, and 8, a bracket 130 attached to the frame of the machine supports an inclined surface 132 which extends into the path of the ledge 124. The inclined surface is arranged to gradually depress the yieldable teeth but when the teeth are directly opposite the teeth of the cooperating gear, the teeth spring into engagement. A similar provision is made for depressing the yieldable teeth on segment gear 106. It consists of an arm 134 bolted to a part of the machine frame and provided with an inclined surface or section 136 which gradually depresses the yieldable teeth just prior to engagement with the cooperating gear.

The purpose of providing yieldable teeth is to prevent the segment gears from overlapping their actions and also to insure positive engagement with the cooperating gear. By snapping or springing the teeth into mesh with the teeth on the adjacent gear, the possibility of having the teeth abut one another is eliminated.

In practice, a batch of bread loaves is made up of one size. If a batch is produced differing in length from the batch which has passed through the slicing machine, a new set of segment gears is substituted for those in the machine. If the new batch has a shorter length of loaf, a segment gear corresponding to segment gear 104 having fewer teeth is added while a segment gear corresponding to segment gear 106 having one or more additional teeth is added. In a batch containing longer bread loaves, the proportion of the teeth is reversed. Instead of completely removing these segment gears from their respective shafts when a change in the conveyor advance is desired, plates may be splined to the shaft 102 having provision for securing gear sectors of varying sizes. An example of such a construction is shown in Fig. 10 wherein a hub 138 splined to shaft 102 is provided with a flange 140 having holes 142 and bolts 144 for securing gear sectors 146 of varying sizes thereto. A similar provision is made for securing a larger gear sector corresponding to segment gear 104 to the shaft 102. This allows the operator to insert and remove without difficulty variable sizes of gear sectors to accommodate different loaf lengths.

Sometimes a batch will vary slightly from the required length. If such is the case, the front end of the loaf may be sliced too thin. This can be corrected by introducing a different set of segment gears which will continue the high speed advance of the conveyor a little further so that the first slice is severed at a greater distance from the end of the loaf. This will overcome the production of thin end slices.

The operation of the machine is readily apparent from the above description. Loaves of bread are placed ahead of the paddles 20 and impelled thereby past the cutter-way. As each cutter traverses the cutter-way, it moves axially in the same direction as the movement of the loaf and at substantially the same rate. The conveyor is driven first at one speed by segment gear 104 and then at a greater speed by segment gear 106. As previously pointed out, the action of these gears is timed with the position and length of the loaves on the conveyor. Segment gear 104 drives the conveyor while a loaf is advancing past the cutter-way and is being sliced by the knives. Segment gear 106 immediately takes up the drive after the rear end of the loaf has passed the cutter-way and drives the conveyor at a greater rate of speed, three times as fast in this instance, until the front end of the next loaf enters the cutter-way. It is during this interval of time that the cutters are ineffectively swinging through the cutter-way, and by shortening up this time interval a saving in time as well as in the power consumed is obtained.

If a different thickness of slice is desired, the forked brace containing the pinion 84 and idler gear 86 is shifted so as to engage the idler gear with one of the other speed change gears, 76, 78, and 80. As described in my copending case, these gears vary the rate of advance of the conveyor relative to the rate of the slicing movement of the knives. This varies the distance of advance of the conveyor for each slicing operation performed by one of the knives.

The action of segment gear 106 is to superimpose an increased speed on the speed of the conveyor selected for producing slices of desired thickness. Since this acceleration only occurs between loaves of bread, it does not affect the actual slicing operation nor does it vary the thickness of the slices cut. For each revolution of the segment gears two distinct speeds are imparted to the conveyor.

What I claim is:

1. A slicing machine comprising, in combination, a cutter, a conveyor for advancing material past the cutter to be sliced thereby, drive means for said conveyor including a pair of rotatable segment gears each having a cooperating gear with which they mesh alternately to transmit driving impulses to said conveyor first through one segment gear then the other, said segment gears cooperating with their respective gears through different gear ratios for driving the conveyor at varying speeds for one rotation of the gear segments, said gear segments each having the teeth which first engage with the cooperating gear yieldable radially, and means for retracting these teeth during the rotation of the segment gears and for permitting said teeth to spring into engaging position.

2. A slicing machine comprising, in combination, a cutter, a conveyor for advancing material past the cutter to be sliced thereby, means for driving said conveyor, said means including a pair of rotatable segment gears each adapted to engage with a cooperating gear wheel, said segment gears engaging with their respective cooperating gear wheel in alternate manner to transmit driving impulses to the conveyor first by one separate gear then by the other, each segment gear engaging with its cooperating gear through unequal gear ratios so that the conveyor is driven at varying speeds for one rotation of the segment gears, each of said segment gears having its first engaging teeth resiliently yieldable radially, and means for retracting said yieldable teeth until they are directly opposite the teeth on the cooperating gear wheel at which time they are sprung into positive engagement with the teeth on the cooperating gear wheel.

3. A slicing machine comprising, in combination, a conveyor for advancing material past the cutter to be sliced thereby, change speed mechanism for driving said conveyor including a pair of rotatable segment gears, a gear cooperatively paired with each of said segment gears and operable in cooperation with its respective segment gear to transmit driving impulses to said conveyor, said segment gear operatively arranged relative to one another so that when one is transmitting driving impulses to the conveyor the other is in its ineffective position of its rotation, means included in said change speed mechanism for rotating one of said segment gears at a faster rate than the other whereby for one rotation of the segment gears the conveyor is driven first at one rate of speed then at another.

4. A variable drive mechanism for a bread slicing machine having a cutter and a conveyor for conducting spaced loaves of bread in successive order across the path of said cutter comprising, in combination a drive shaft, a driven shaft operatively connected with the conveyor, speed change mechanism including two segment gears each fixed on one of said shafts and adapted to mesh with a cooperating gear operatively driven from the other shaft, said segment gears arranged to drive said conveyor alternately, one when a loaf of bread is conducted across the path of the cutter, and the other when an unoccupied portion of the conveyor between two loaves is conducted across the path of the cutter, and means for rotating the cooperating gear of said last mentioned segment gear at a rate greater than that of said other cooperating gear whereby the advance of the conveyor is speeded up.

5. A bread slicing machine comprising, in combination, a cutter, a conveyor for advancing spaced apart loaves of bread across the path of said cutter, means for driving said conveyor at variable speeds including a pair of segment gears arranged to transmit driving impulses to said conveyor in succeeding order, one of said segment gears adapted to function during the advance of a loaf of bread across the path of the said cutter, the other gear segment adapted to function during the advance of a space between adjacent loaves across the path of the cutter, and means engageable with the teeth of said segment gears and adapted to rotate the same at different rates of speed whereby said conveyor advances at one rate of speed when a loaf of bread is being sliced and at a different rate when a space between loaves traverses the path of said cutter.

6. A slicing machine comprising, in combination with a cutter having a cutter-way through which it moves, a conveyor for advancing objects past said cutter-way, a shaft for driving said conveyor, a pair of segment gear wheels fixed on said shaft and so constructed and arranged on said shaft that the toothed peripheries of the segments are offset circumferentially around said shaft, separate gear means adapted to engage said toothed peripheries of said segment gear wheels and to drive the same at different rates of speed whereby for one rotation of said shaft the conveyor is advanced first at one speed then at another speed.

7. A slicing machine comprising, in combination with a cutter having a cutter-way through which it moves, a conveyor for advancing objects past said cutter-way, separate gear wheel means each including a segment gear wheel operatively coupled to said conveyor to drive the same, said segment gear wheels so constructed and arranged relative to one another that they successively transmit driving impulses to said conveyor to advance the same, means for causing one of said gear wheel means to drive the conveyor at a faster rate of speed than the other whereby the conveyor is continuously advanced first at one rate of speed then at another rate of speed.

8. A bread slicing machine comprising, in combination with a cutter having a cutter-way through which it moves, a conveyor for advancing bread loaves in spaced succession past said cutter-way to be sliced by said cutter, separate gear wheel means each including a segment gear wheel operatively coupled to said conveyor for driving the same, said segment gear wheels so constructed and arranged relative to one another that one is adapted to transmit driving impulses to said conveyor as the loaves of bread are conveyed past said cutter-way by said conveyor and the other is adapted to transmit driving impulses to said conveyor as the unoccupied sections of the conveyor between the loaves of bread advance past said cutter-way, means for causing the gear wheel means in which said last mentioned segment gear wheel is included to drive the conveyor at a faster rate of speed than the other gear wheel means whereby the conveyor is continuously advanced first at a relatively slower rate of speed when a loaf of bread is being sliced and at a faster rate of speed when the unoccupied sections of the conveyor between the loaves of bread pass the cutter-way.

9. A slicing machine comprising, in combination, a cutter operable to move through a cutter-way to perform its slicing operation, a conveyor adapted to support a series of objects of substantially the same length in uniformly spaced relationship and to convey the objects in successive order through said cutter-way, a power operated device having two distinct operative connections with said conveyor through which it alternately operates to drive said conveyor at unequal but constant rates of speed, said driving connections so arranged relative to one another and the spatial condition of the objects carried by said conveyor that the connection which imparts a slower rate of movement to the conveyor drives the latter when objects carried thereby are advanced past said cutter-way and the other connection which imparts a faster rate of movement to the conveyor drives the latter when the spaces between the objects carried by the conveyor pass the cutter-way.

FRANK L. LAMOREAUX.